(12) United States Patent
Gautier-Graindorge

(10) Patent No.: US 11,402,025 B2
(45) Date of Patent: Aug. 2, 2022

(54) THERMOSTATIC VALVE FOR A FLUID FLOW CIRCUIT, AND METHOD FOR PRODUCING SUCH A THERMOSTATIC VALVE

(71) Applicant: VERNET, Ollainville (FR)

(72) Inventor: Guillaume Gautier-Graindorge, Montigny le Bretonneux (FR)

(73) Assignee: VERNET, Ollainville (FR)

( * ) Notice: Subject to any disclaimer, the term of this patent is extended or adjusted under 35 U.S.C. 154(b) by 966 days.

(21) Appl. No.: 16/087,551

(22) PCT Filed: Mar. 22, 2017

(86) PCT No.: PCT/EP2017/056860
§ 371 (c)(1),
(2) Date: Sep. 21, 2018

(87) PCT Pub. No.: WO2017/162760
PCT Pub. Date: Sep. 28, 2017

(65) Prior Publication Data
US 2020/0325997 A1     Oct. 15, 2020

(30) Foreign Application Priority Data
Mar. 23, 2016   (FR) ...................... 1652490

(51) Int. Cl.
*F16K 31/00*     (2006.01)
*F16K 3/26*      (2006.01)
(Continued)

(52) U.S. Cl.
CPC .............. *F16K 3/265* (2013.01); *F16K 3/314* (2013.01); *F16K 31/002* (2013.01); *G05D 23/1852* (2013.01)

(58) Field of Classification Search
CPC ...... F16K 31/002; F16K 31/025; F16K 3/265; F16K 3/314; F01P 7/16; G05D 23/022; G05D 23/1852
See application file for complete search history.

(56) References Cited

U.S. PATENT DOCUMENTS 1,844,488 A * 2/1932 Ward ................... G05D 23/022
236/34
4,091,991 A * 5/1978 Sliger .................. G05D 23/022
123/41.08
(Continued)

FOREIGN PATENT DOCUMENTS

CN          1516792 A    7/2004
CN         102091677 B   4/2013
(Continued)

OTHER PUBLICATIONS

Search Report, dated Dec. 9, 2016, in French Patent Application No. FR 1652490.
(Continued)

Primary Examiner — Umashankar Venkatesan
(74) Attorney, Agent, or Firm — Knobbe, Martens, Olson & Bear, LLP

(57) ABSTRACT

A valve with a sleeve movable along its central axis regulates fluid flow between the orifices of a housing for the valve. The valve has a thermost including heat-sensitive and movable parts, the latter being translatable relative to the heat-sensitive part along the central axis during expansion of a thermodilatable material contained in the heat-sensitive part. The thermostat is kinematically connected to the housing by a stirrup and kinematically connected to the sleeve, such that movements between the heat-sensitive and movable parts regulate the sleeve. In order for the valve to be more compact and safer, the stirrup has an arm extending lengthwise parallel to the central axis and connecting inside (Continued)

the sleeve the heat-sensitive part to an attachment part of the housing, and a fastener at its longitudinal end opposite the thermostat suitable for locking to the attachment part by plastic deformation.

15 Claims, 6 Drawing Sheets

(51) Int. Cl.
 *F16K 3/314* (2006.01)
 *G05D 23/185* (2006.01)

(56) References Cited

U.S. PATENT DOCUMENTS

| | | | | | |
|---|---|---|---|---|---|
| 4,524,907 | A | * | 6/1985 | Wong | G05D 23/022 236/100 |
| 4,913,101 | A | * | 4/1990 | Sliger | F01P 7/16 123/41.1 |
| 5,123,591 | A | * | 6/1992 | Reynolds | F01P 7/16 137/454.2 |
| 5,294,046 | A | * | 3/1994 | Fishman | F01P 11/16 236/34.5 |
| 5,381,953 | A | * | 1/1995 | Fishman | F01P 11/16 236/34.5 |
| 2002/0096571 | A1 | | 7/2002 | Kunze | |
| 2006/0201976 | A1 | | 9/2006 | Bloom | |
| 2006/0266964 | A1 | | 11/2006 | Farley | |
| 2015/0041552 | A1 | * | 2/2015 | Maraux | G05D 23/022 236/101 R |
| 2017/0248977 | A1 | * | 8/2017 | Posternak | G05D 23/022 |

FOREIGN PATENT DOCUMENTS

| | | | |
|---|---|---|---|
| CN | 102414494 B | | 8/2013 |
| CN | 203656269 U | | 6/2014 |
| CN | 104137016 A | | 11/2014 |
| CN | 204573118 U | | 8/2015 |
| CN | 105370923 A | | 3/2016 |
| DE | 10 2009 030 237 A1 | | 12/2010 |
| DE | 10 2010 046 811 A1 | | 3/2012 |
| FR | 2 856 161 A1 | | 12/2004 |
| FR | 2 914 977 A1 | | 10/2008 |
| FR | 2 961 917 A1 | | 12/2011 |
| FR | 2 983 525 A1 | | 6/2013 |
| FR | 2 993 036 A1 | | 1/2014 |
| GB | 2108663 A | * | 5/1983 ........... G05D 23/022 |
| WO | WO 2016/016219 A1 | | 2/2016 |

OTHER PUBLICATIONS

International Search Report, dated May 30, 2017, in International Patent Application No. PCT/EP2017/056860.

\* cited by examiner

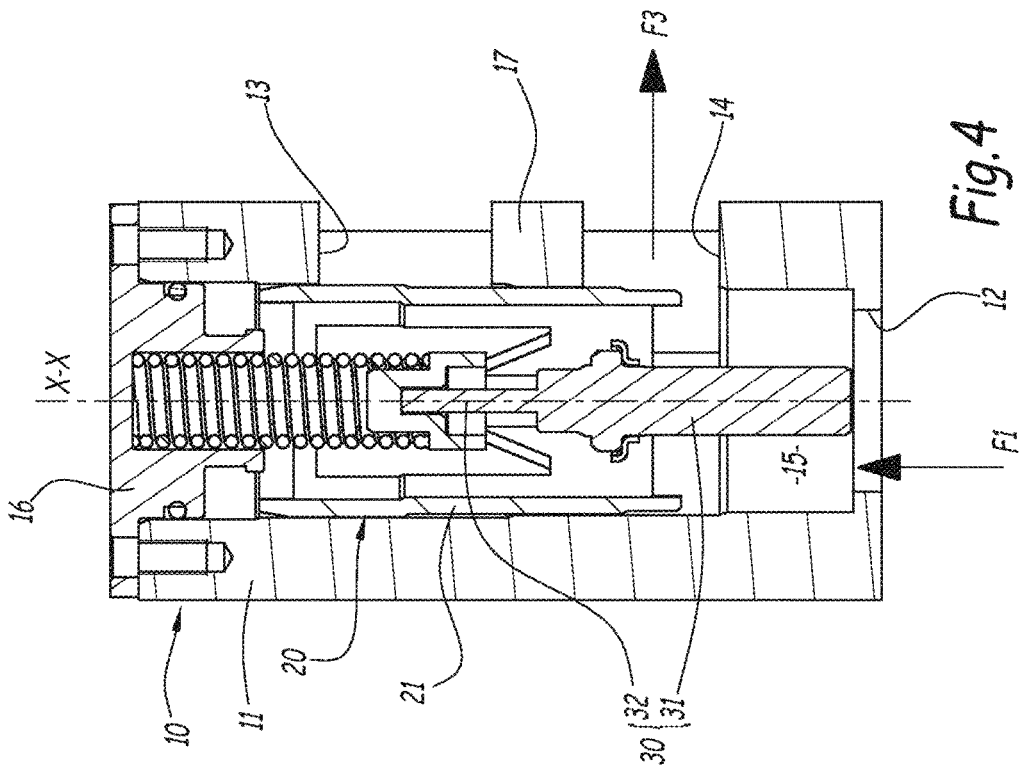
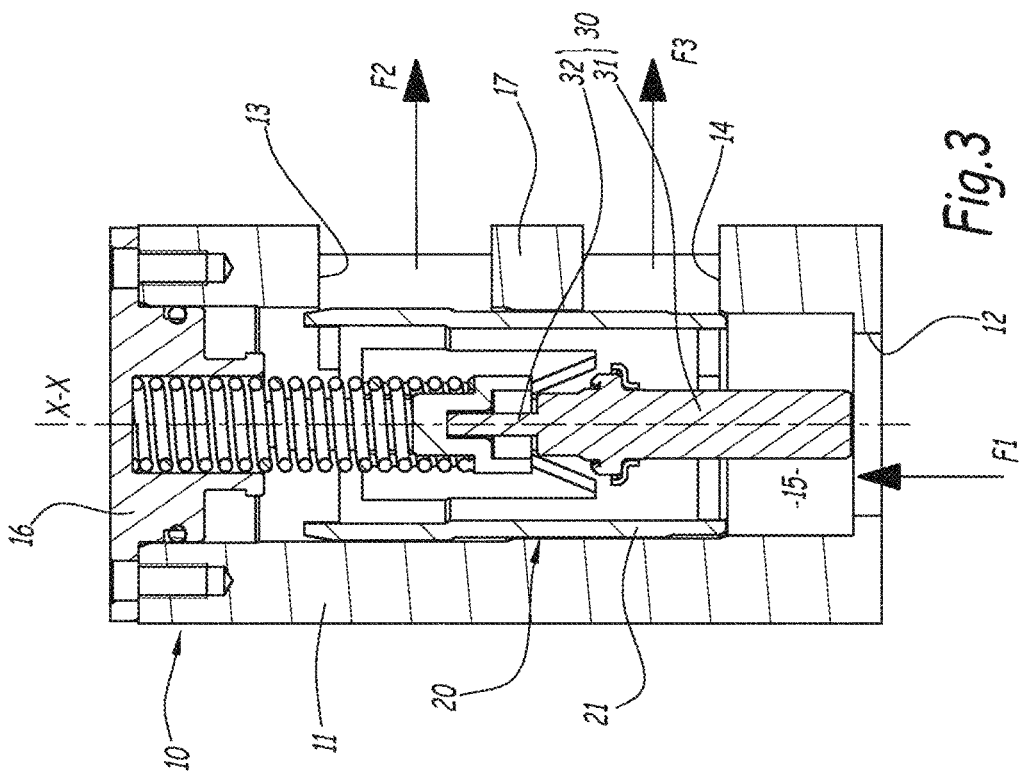

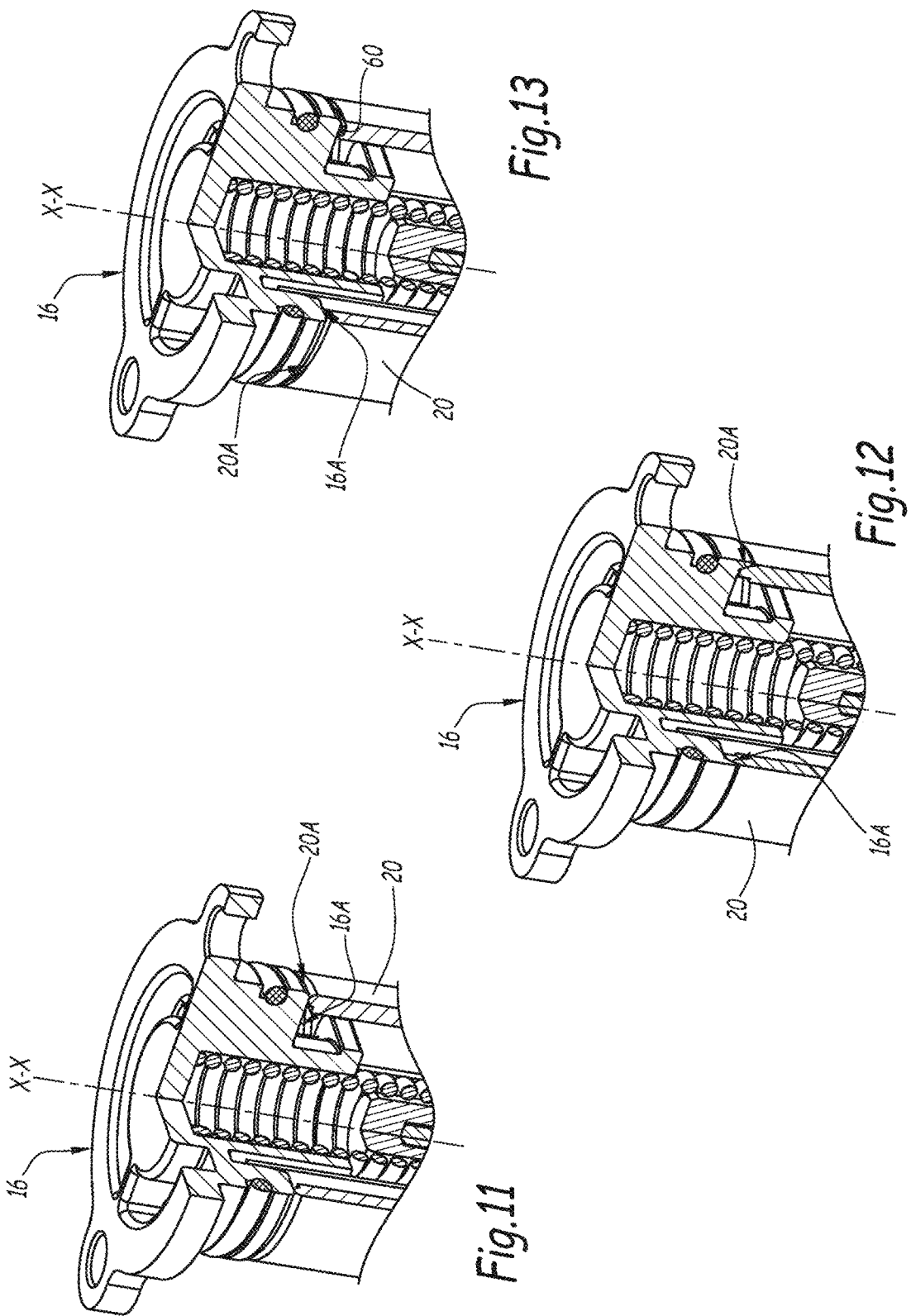

THERMOSTATIC VALVE FOR A FLUID FLOW CIRCUIT, AND METHOD FOR PRODUCING SUCH A THERMOSTATIC VALVE

PRIORITY AND CROSS REFERENCE TO RELATED APPLICATIONS

This application is the U.S. National Phase Application under 35 U.S.C. § 371 of International Application No. PCT/EP2017/056860, filed Mar. 22, 2017, designating the U.S. and published as WO 2017/162760 A1 on Sep. 28, 2017, which claims the benefit of French Application No. FR 1652490, filed Mar. 23, 2016. Any and all applications for which a foreign or a domestic priority is claimed is/are identified in the Application Data Sheet filed herewith and is/are hereby incorporated by reference in their entireties under 37 C.F.R. § 1.57.

FIELD

The present invention relates to fluid flow circuit thermostatic valve.

SUMMARY

The present invention relates to thermostatic valve for a fluid flow circuit, and method for producing such a thermostatic valve.

BRIEF DESCRIPTION OF THE DRAWINGS

The invention will be better understood upon reading the following description, provided solely as an example and done in reference to the drawings, in which:

FIGS. 3 and 4 are views similar to FIG. 1, showing the valve in respective operating states that are different from one another and different from the operating state shown in FIG. 1;

FIGS. 11 to 13 are perspective views, in partial section, of a part of respective alternatives of the valve of FIG. 1, according to the invention.

DETAILED DESCRIPTION

Figure 2:
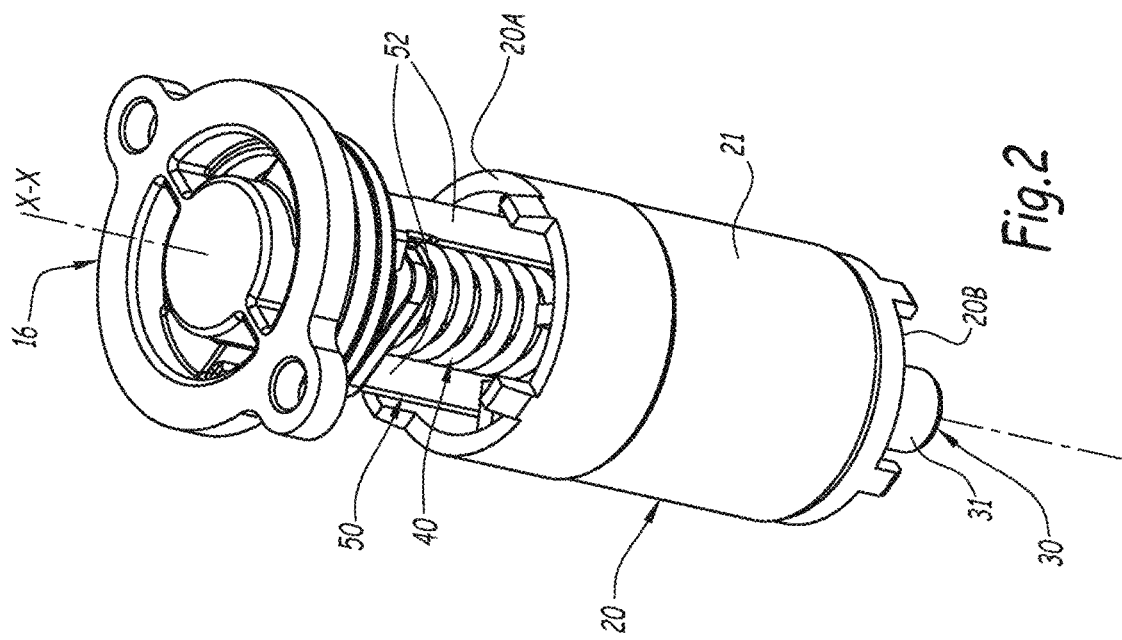
FIG. 2 is a perspective view of a preassembled assembly that belongs to the valve of FIG. 1.

The present invention relates to a thermostatic valve for a fluid circulation circuit. It also relates to a method for manufacturing such a thermostatic valve.

The invention more specifically examines thermostatic valves with sleeves, i.e., valves inside the housing from which the flow of a fluid between inlet and outlet orifices is regulated by a sleeve whose movement is controlled by a thermostatic element whose temperature is stressed by said fluid.

Valves with a sleeve are commonly used in high-displacement heat engines, in particular those equipping trucks or certain motor vehicles, which require higher coolant flow rates for operation than those encountered for heat engines with lower displacement, for which the thermostatic valves used generally have gates. In fact, using a sleeve generally makes it possible to have a so-called balanced shutter i.e., a shutter for which the difference in the pressures prevailing on either side of the walls of the sleeve is substantially zero in the direction in which the sleeve is moved by the thermostatic element, this direction in practice being parallel to the central axis of the sleeve. Conversely, in a thermostatic valve with a gate, the latter extends in a plane perpendicular to the direction in which the gate is moved by the thermostatic element, such that the pressure differences prevailing on either side of the gate in that direction reaches high values, in particular when the circulation of fluid is interrupted by the gate. The energy necessary to unstick the gate from its seat is then often significant, even more so when the fluid flow rates to be regulated are significant.

To connect the part of the thermostatic element intended to remain stationary kinematically to the housing, it is possible to use a stirrup, i.e., a rigid part that, without deformation, transmits, between the housing and the aforementioned part of the thermostatic element, stresses for maintenance in position generated during the operation of the valve, in particular during the deployment and return of the part of the thermostatic element kinematically connected to the sleeve. This stirrup may be secured easily and effectively to the thermostatic element, for example by fitting, crimping, welding, etc., but the fastening of the stirrup to the housing, generally made from plastic, may prove more problematic: in particular due to the presence of the sleeve, as well as assembly constraints of the valve, the stirrup is often fastened to the housing by catching or using similar arrangements, which must be arranged outside the geometric enclosure defined by the outer side face of the sleeve, which considerably increases the outer diameter of the valve, and which incurs the risk of an untimely release of the stirrup during the initial installation of the valve, its use and/or its maintenance.

It will be noted that the aforementioned stirrup must not be combined with the stirrups, which are considered for example in WO 2016/016219 and FR 2,993,036 and which are attached to the housing not to kinematically connect the latter to the part of the thermostatic element intended to remain stationary, but to directly react the forces produced by a compressed spring provided to return the stationary part and the moving part of the thermostatic element toward one another.

The aim of the present invention is to propose a thermostatic valve with a sleeve, which is more compact and safer.

To that end, the invention relates to a thermostatic valve for a fluid circulation circuit, the valve comprising:
- a housing, which is provided with orifices for passing a fluid of the circulation circuit and inside which said fluid flows between the orifices,
- a sleeve for regulating the flow of the fluid in the housing between the orifices, said sleeve defining a central axis and being movable relative to the housing along said central axis,
- a thermostatic element, which includes both a heat-sensitive part, containing a thermodilatable material and arranged on the flow of the fluid in the housing between the orifices, and a movable part, translatable relative to the heat-sensitive part along the central axis under the effect of an expansion of the thermodilatable part, a first part of the thermostatic element, among its heat-sensitive and movable parts, being kinematically connected to the housing by a stirrup while the second part of the thermostatic element is kinematically connected to the sleeve, such that the movements between the heat-sensitive and movable parts of the thermostatic element command, by movement of the sleeve along the central axis, the regulating action of said sleeve on the flow of the fluid in the housing between the orifices, wherein the stirrup comprises at least one arm:
  that extends lengthwise parallel to the central axis,
  that connects, through the inside of the sleeve, the first part of the thermostatic element, to an attachment part of the housing, and
  that, at its longitudinal end opposite the first part of the thermostatic element, is provided with fastening arrangements for fastening to the attachment part, said fastening arrangements being suitable for locking to the attachment part by plastic deformation of at least one part of the fastening arrangements.

The invention also relates to a method for manufacturing a thermostatic valve for a fluid circulation circuit, in particular of the valve as defined above, said valve comprising:
  a housing, which is provided with orifices for passing a fluid of the circulation circuit and inside which said fluid flows between the orifices,
  a sleeve for regulating the flow of the fluid in the housing between the orifices, said sleeve defining a central axis and being movable relative to the housing along said central axis, and
  a thermostatic element, which includes both a heat-sensitive part, containing a thermodilatable material and arranged on the flow of the fluid in the housing between the orifices, and a movable part, translatable relative to the heat-sensitive part along the central axis under the effect of an expansion of the thermodilatable material, in which method a stirrup is used to kinematically connect a first part of the thermostatic element, among its heat-sensitive and movable parts, while the second part of the thermostatic element is kinematically connected to the sleeve, such that, in the assembled state of the valve, the movements between the heat-sensitive and movable parts of the thermostatic element command, by movement of the sleeve along the central axis, the regulating action of said sleeve on the flow of the fluid in the housing between the orifices, wherein in order to kinematically connect the first part of the thermostatic element to the housing, the method provides that:
  during a first step, at least one arm of the stirrup is arranged such that the longitudinal direction of said arm is parallel to the central axis and the or each arm extends lengthwise, through the inside of the sleeve, from the first part of the heat-sensitive element to an attachment part of the housing, then
  during a second step, the or each arm is fastened and locked to the attachment part of the housing, by plastically deforming at least one part of fastening arrangements with which the longitudinal end of the arm is provided opposite the first part of the thermostatic element.

Thus, the stirrup of the valve according to the invention fixedly connects the thermostatic element and the housing to one another, while extending inside the sleeve. More specifically, depending on the position of the sleeve along its central axis controlled by the thermostatic element, at least part of the stirrup is arranged inside the sleeve, the rest of the stirrup emerging from an axial end of the sleeve while extending parallel to the central axis of the sleeve. Furthermore, at its end turned toward the housing, the stirrup is fastened, by plastic deformation, to a dedicated part of the housing, called attachment part: once said stirrup end is plastically deformed, the stirrup is locked to the attachment part of the housing, i.e., it is kept in position irreversibly, unless one tries again to deform the end of the stirrup to try to give it back a configuration similar to its initial, non-deformed configuration. In other words, owing to the plastic deformation of its end in order to fasten the latter to the attachment part of the housing, the stirrup is fastened permanently compared to fastening arrangements by "simple" catching, i.e., by catching between parts not involving significant deformation of said parts. The valve according to the invention thus proves both compact and safe, in that the fastening of its stirrup to the housing is based on arrangements that are both fitted within the geometric envelope defined by the inner face of the sleeve and not releasable inadvertently or through incorrect manipulation during assembly, operation and maintenance of the valve.

According to additional advantageous features of the valve and/or the method according to the invention:
  The fastening arrangements of the or each arm include at least one fin that, by plastic deformation, is bent toward the central axis relative to the rest of the arm, and the attachment part of the housing includes, for each fin, a rim that is suitable for forming a stop along the central axis for the fin.
  The or each fin is bent around a bending axis that is parallel to the central axis.
  The fastening arrangements of the or each arm further include a body that is arranged in the longitudinal extension of the arm, the or each fin of said arm protruding from said body and being bent toward the central axis relative to said body, and the attachment part of the housing includes, for each arm, a placement wall having:
    a main face, which is covered by the body, and
    for each fin, a side edge, at an axial end of which the corresponding rim is arranged protruding and against which the rim is folded down.
  for each arm, two fins are provided, which protrude on either side of the body and which are folded down respectively against the corresponding side edges of the placement wall while gripping said placement wall between them.
  The fastening arrangements of the or each arm further include a tongue, which extends the body in the longitudinal direction of the arm, and in that the attachment part of the housing delimits, for each arm, a housing, which is complementary to the tongue and in which the tongue is inserted along the central axis, so as to position the body covering the main face of the corresponding placement wall.
  Several arms are provided, which are distributed regularly around the central axis.
  The sleeve is inwardly provided with at least one branch for connecting to the second part of the thermostatic element, the or each branch extending transversely to the central axis, and the fastening arrangements occupy, around the central axis, one or several angular portions that are separate from one or more angular portion(s) respectively occupied, around the central axis, by the branch or branches.

The attachment part is supported by a stopper of the housing, which is removable relative to the rest of the housing and which, in the assembled state of the valve, sealably closes an inner chamber of the housing, by which the fluid flows into the housing between the orifices.

The stopper bears, on its face turned toward the inner chamber, a sealed bearing seat for an axial end of the sleeve.

The valve further comprises a return spring provided to return the movable part toward the heat-sensitive part of the thermostatic element during a contraction of the thermodilatable material, and the return spring is inserted, in a compressed state along the central axis, between the second part of the thermostatic element and the housing, while bearing axially against the stopper.

In order to carry out the first step, the method provides that:
the stirrup is kinematically connected to the first part of the thermostatic element, then
the relative positioning of the stirrup and the housing is adjusted so as to position the fastening arrangements axially aligned with and across from the attachment part of the housing.

To carry out the second step, at least one fin of the fastening arrangements is bent toward the central axis so as to take the or each fin from a mounting configuration, in which the fin does not interfere axially with the attachment part during the first step, to a locking configuration, in which the fin abuts, toward the central axis, against a rim of the attachment part.

In the mounting configuration, the or each fin is cambered toward the central axis.

FIGS. 1 to 6 show a valve 1.

Figure 1:
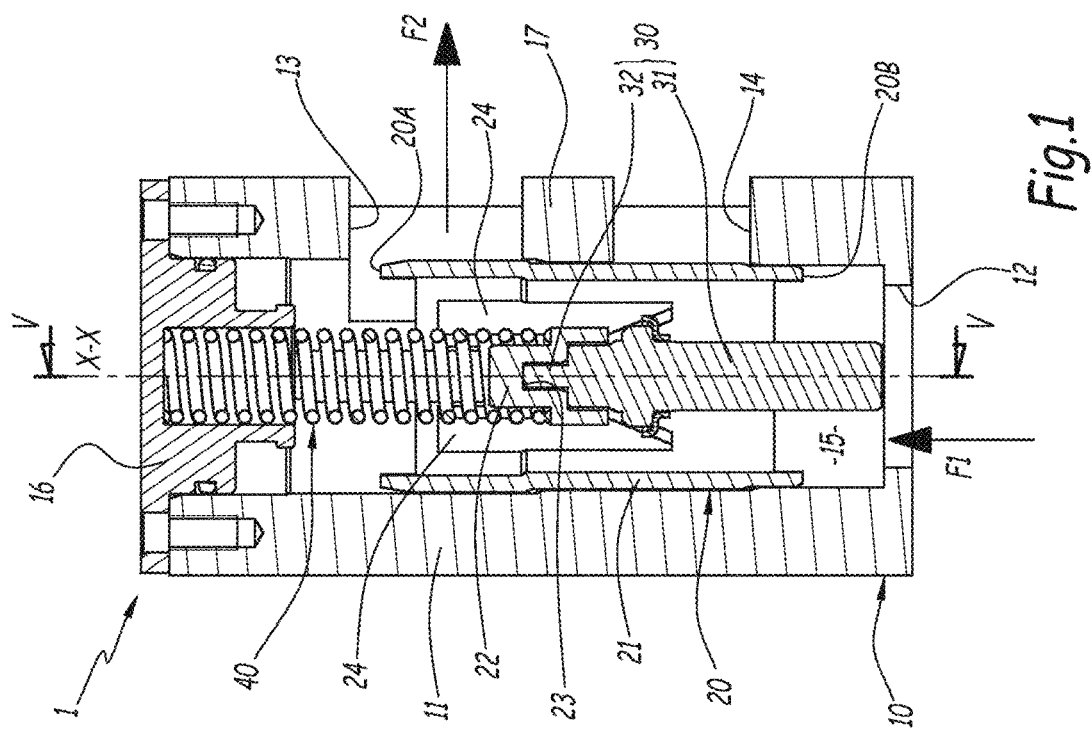
FIG. 1 is a longitudinal sectional view of a valve according to the invention.

As clearly shown in FIG. 1, the valve 1 comprises a housing 10 including a main body 11 that defines fluid passage orifices 12, 13, 14 all emerging in an inner chamber 15 of the housing 10. The valve 1 is provided to be used in a fluid circulation circuit, in particular a circuit making it possible, by circulation of the cooling fluid, to cool a body involved in propelling a vehicle, such as a high-displacement truck or a car. At least one of the orifices 12, 13 and 14 allows the fluid to enter the inside of the housing 10, to supply its inner chamber 15, while at least one other of said orifices 12, 13 and 14 allows the fluid to leave the housing 10, by evacuating its chamber 15.

As an example illustrated by arrows F1, F2 and F3 drawn in FIGS. 1, 3 and 4, the orifice 12 is an inlet orifice through which the fluid enters the inner chamber 15 of the housing 10, as indicated by arrow F1, while the orifices 13 and 14 are outlet orifices by which the fluid leaves the chamber 15, as respectively indicated by arrows F2 and F3. Subject to a regulation described in detail hereinafter, the fluid flowing in the chamber 15, from the inlet orifice 12, leaves said chamber 15:
either completely through the outlet orifice 13 as shown in FIG. 1, while being sent directly to a first member placed on the circulation circuit, in particular a member to be cooled by said fluid,
or completely through the outlet orifice 14 as shown in FIG. 4, while being sent first to a second member placed on the circulation circuit, in particular a heat exchanger that cools the fluid, such as a radiator, then, if applicable, to the aforementioned first member, and
or partly through the outlet orifice 13 and the rest through the outlet orifice 14, like in FIG. 3.

As shown in FIGS. 1 and 2, the housing 10 further includes a stopper 16 that is fixedly secured to the main body 11 so as to close the chamber 15 sealably. Advantageously, for reasons that will appear later, the fastening of the stopper 16 on the main body 11 is removable, the stopper 16 thus being able to be released with respect to the main body 11 so as to open the chamber 15. In practice, the embodiment for fastening the stopper 16 to the main body 11 is not limiting.

In order to regulate the flow of the fluid in the housing 10 between the orifices 12, 13 and 14, the valve 1 comprises a sleeve 20 which, as clearly shown in FIG. 2, has a globally tubular shape, which is centered on a geometric axis X-X and which, in the example embodiment considered here, has a circular base. The sleeve 20 thus has two opposite axial ends 20A and 20B, which are each open in the direction of the axis X-X and which are connected to one another by a solid cylindrical skirt 21 of the sleeve 20, centered on the axis X-X.

For convenience, the rest of the description is oriented considering that the axis X-X is vertical, with the end 20A of the sleeve 20 turned upward while its end 20B is turned downward.

The sleeve 20 is mounted sliding along its axis X-X inside the housing 10, while being received in the chamber 15 and being guided slidingly therein by a cylindrical wall 17 of the main body 11, said cylindrical wall 17 surrounding the skirt 21 in a fitted and sealed manner. The orifices 13 and 14 are located on either side, along the axis X-X, of the cylindrical wall 17, the orifice 13 being located above the latter while the orifice 14 is located below the cylindrical wall 17. Likewise, the chamber 15 is distributed, axially on either side of the cylindrical wall 17, in an upper part and a lower part: the end 20B of the sleeve 20 is located in the lower part of the chamber 15, the orifice 12 emerging in said lower part; the end 20A of the sleeve 20 is located in the upper part of the chamber 15 and said upper part is closed by the stopper 16, the latter advantageously being aligned with the sleeve 20 along the axis X-X.

The sleeve 20 is movable between a lower position, shown in FIG. 1, and an upper position, shown in FIG. 4, while passing through an intermediate position, shown in FIG. 3. When the sleeve 20 is in the lower position of FIG. 1, its skirt 21 closes off the orifice 14 while leaving the orifice 13 open, such that the fluid admitted through the orifice 12 into the lower part of the chamber 15 flows inside the skirt 21 to the upper part of the chamber 15 before reaching the orifice 13. When the sleeve 20 is in the upper position of FIG. 4, its skirt 21 closes off the orifice 13 while leaving the orifice 14 open such that the fluid admitted through the orifice 12 into the lower part of the chamber 15 reaches the orifice 14 directly. When the sleeve 20 is in the intermediate position of FIG. 3, its skirt 21 leaves the orifices 13 and 14 open, such that the fluid admitted through the orifice 12 into the lower part of the chamber 15 reaches both the orifices 13 and 14.

In order to move the sleeve 20 along the axis X-X between the lower, intermediate and upper positions, and therefore in order to command the regulating action of said sleeve on the flow of the fluid in the housing 10 between the orifices 12, 13 and 14, the valve 1 comprises a thermostatic element 30. In a manner known in itself and as shown only schematically in FIGS. 1 and 3 to 5, the thermostatic element 30 includes a thermostatic part 31 and a movable part 32 that is movable relative to the heat-sensitive part 31 in translation along a translation axis that, in the assembled state of the valve 1, is substantially combined with the axis X-X. The heat-sensitive part 31, which typically includes a metal cup, contains a thermo-dilatable material, such as a wax, and is arranged on the flow of the fluid in the housing 10 between the orifices 12, 13 and 14. In the example embodiment considered in the figures, the heat-sensitive part 31 is arranged substantially at the inlet orifice 12. The movable part 32, which typically includes a piston, retracts and deploys with respect to the heat-sensitive part 31, by translation along the axis X-X, during a volume variation of the thermo-dilatable material contained in the heat-sensitive part 31. Thus, under the effect of an expansion of this thermo-dilatable part, the movable part 32 deploys in translation relative to the heat-sensitive part 31, whereas, during a contraction of the thermo-dilatable material, the movable part 32 retracts in translation relative to the heat-sensitive part 31 under the action of a return spring 40, which, in the assembled state of the valve 1, is inserted, in a compressed state along the axis X-X, between the movable part 32 and the housing 10.

Within the valve 1 considered in the figures, the movable part 32 tops the heat-sensitive part 31, the axial end of said movable part 32, which emerges and deploys with respect to the heat-sensitive part 31, thus being its upper end. Furthermore, the heat-sensitive part 31 of the thermostatic element 30 is kinematically connected to the housing 10 by a stirrup 50 that will be described in more detail hereinafter. The movable part 32 is kinematically connected to the sleeve 20. It will be understood that the relative movements between the heat-sensitive 31 and movable 32 parts of the thermostatic element 30 command the movement of the sleeve 20 along the axis X-X relative to the housing 10.

Figure 5:
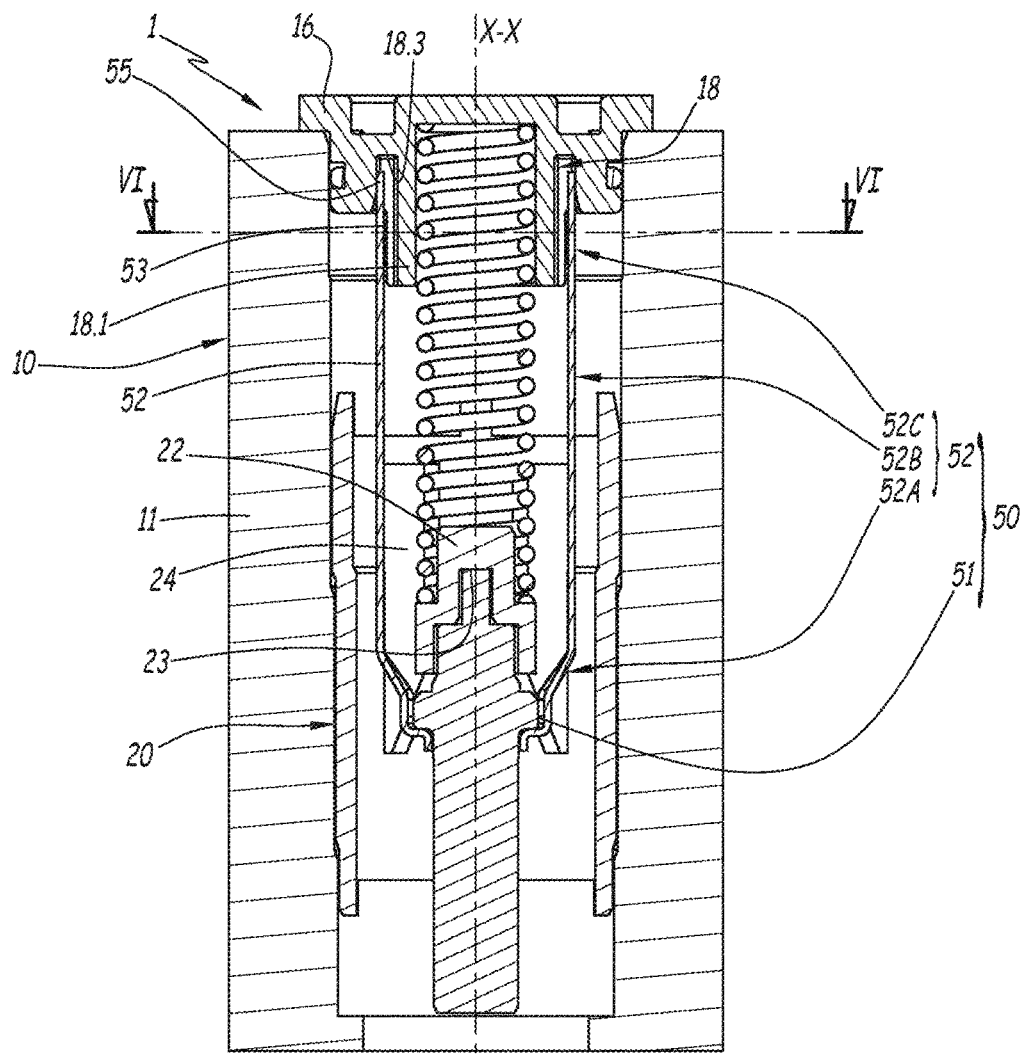
FIGS. 5 and 6 are sectional views along line V-V of FIG. 1 and line VI-VI of FIG. 5, respectively.

As clearly shown in FIGS. 1 and 5, the connection between the movable part 32 of the thermostatic element 30 and the sleeve 20 is, in the example considered here, done by shape cooperation between the upper end of the movable part 32 and a connecting tip 22 with which the sleeve 20 is inwardly and rigidly provided. To that end, the connecting tip 22 includes a blind housing 23, which is centered on the axis X-X and which axially receives the upper end of the movable part 32, with axial bearing of said upper end against the bottom of the housing 23. Furthermore, the connecting tip 22 includes branches 24 that rigidly connect the housing 23 to the skirt 21, while extending transversely to the axis X-X: as shown in FIGS. 1, 5 and 6, these branches 24 are distributed regularly around the axis X-X, four of them being provided in the embodiment considered in the figures.

The axial bearing between the upper end of the movable part 32 and the connecting tip 22 is maintained under the effect of the return spring 40, the latter being arranged compressed while bearing axially downward against the connecting tip 22 and bearing axially upward against the stopper 16. Advantageously, like in the example considered here, the upper end of the spring 40 cooperates by complementarity with shape developments of the inner face of the stopper 16, and likewise, the lower end of the spring 40 cooperates by complementarity with shape developments of the upper face of the connecting tip 22, so as to center the spring 40 on the axis X-X.

Figure 7:
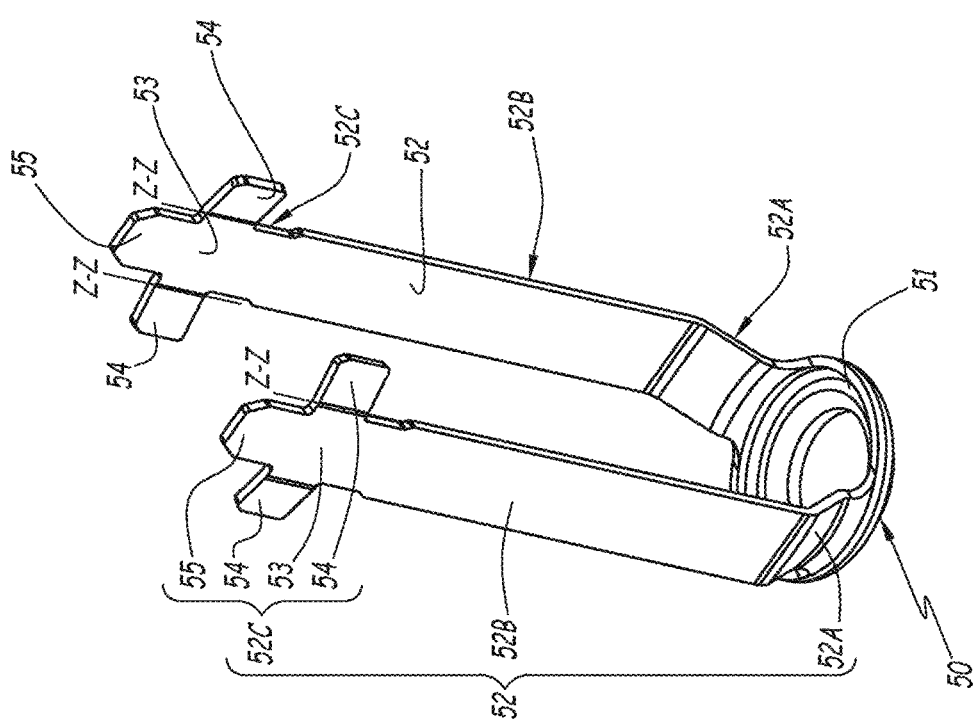
FIG. 7 is a perspective view of a stirrup belonging to the valve of FIG. 1.

The stirrup 50, which, as mentioned above, kinematically connects the housing 10 and the heat-sensitive part 31, is shown alone and not yet assembled to the rest of the valve 1 in FIG. 7. As clearly shown in this FIG. 7, and as shown in FIGS. 1 and 5, said stirrup 50 includes a ring 51 in the lower part. In the example embodiment considered here, the ring 51 surrounds the heat-sensitive part 31 and is secured to the latter by any appropriate means, for example by fitting, welding, crimping, clipping, etc. In practice, the embodiment of the ring 51, as well as the embodiment of the connection between said ring and the heat-sensitive part 31, are not limiting with respect to the invention, as long as, in the assembled state of the valve 1 and when said valve regulates the flow of the fluid between the orifices 12, 13 and 14 by movement of its sleeve 20, the stirrup 50 is kinematically connected to the heat-sensitive part 31.

Figure 6:
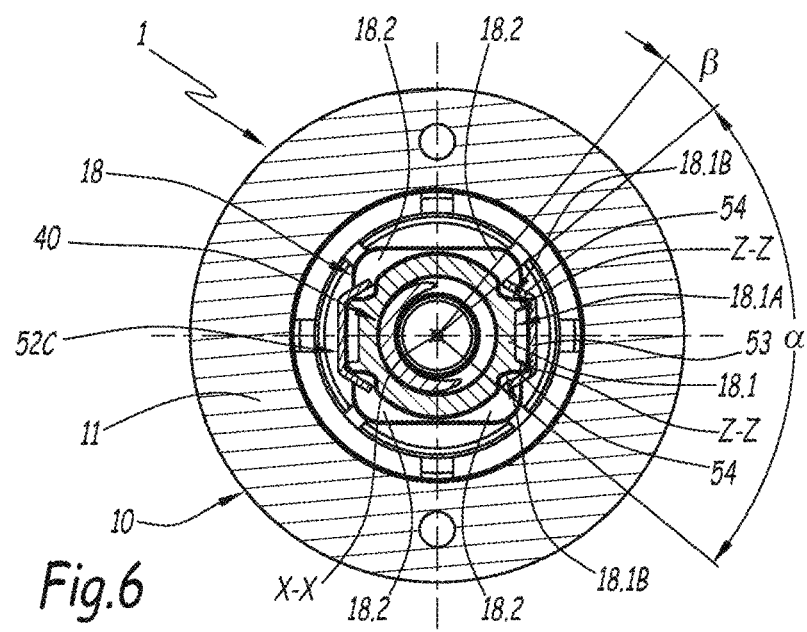

Furthermore, as clearly shown in FIGS. 5 to 7, the stirrup 50 includes two arms 52, which each extend lengthwise, upward, from the ring 51 and which are diametrically opposite along the periphery of said ring. Each arm 52 thus includes, successively along its longitudinal direction, a lower end 52A, a running part 52B and an upper end 52C.

The lower end 52A of each arm 52 securely connects the rest of the arm 52 to the ring 51. Said lower end 52A is in particular rigidly secured to the ring 51, while for example being integral with a portion of said ring, like in the example considered in the figures. This being said, other example embodiments can be considered for fixedly securing the lower end 52A of each arm 52 to the ring 51, in particular taking into account the embodiment of said ring 51. In all cases, using the ring 51 or a functionally similar part of the stirrup 50, the lower end 52A of each arm 52 is, in the assembled state of the valve 1, kinematically connected to the heat-sensitive part 31 of the thermostatic element.

The running part 52B of each arm 52 connects the lower 52A and upper 52C ends of said arm to one another. According to one practical embodiment, which is implemented in the example considered here, said running part 52B assumes the form of a small plate, which is elongated in the longitudinal direction of the arm and which is planar. In the assembled state of the valve 1, the running part 52B of each arm 52 extends lengthwise parallel to the axis X-X and, in the embodiment considered here, the small plate forming said running part 52B is arranged to be orthoradial to the axis X-X, as shown in FIGS. 2 and 5. Furthermore, the arms 52 are, at least for the lower region of their running part 52B, arranged inside the sleeve 20, while being arranged, along a peripheral direction around the axis X-X, arranged between the branches 24 of the connecting end-piece 22.

The upper end 52C of each arm 52 is designed to fasten said arm to the housing 10, while being locked to the latter by plastic deformation of at least part of said upper end 52C. To that end, in the embodiment considered here, each end 52C includes, or is made up of:

- a body 53, which is arranged in the longitudinal extension of the running part 52B of the corresponding arm 52 and which in particular has a planar shape forming a rectilinear upward extension of the small plate making up the running part 52B;
- two fins 54, which, as clearly shown in FIGS. 6 and 7, protrude on either side of the body 53, while respectively extending from the opposite side edges of said body 53, having noted that, for reasons that will appear later, each fin 54 is, by plastic deformation, able to be folded toward the axis X-X relative to the body 53, advantageously around a folding axis Z-Z parallel to the longitudinal direction of the corresponding arm 52; and
- a tongue 55, which, as clearly shown in FIGS. 5 and 7, upwardly extends the body 53 in the longitudinal direction of the corresponding arm 52, said tongue 55 thus protruding upward from the upper edge of the body 53.

According to one practical embodiment, which is also implemented in the example considered in the figures, each arm 52 is made in the form of a single-piece part, in particular from metal. More generally, the stirrup 50 is advantageously made in the form of a one-piece part, in particular made from a metal sheet that is shaped by cutting and bending and/or stamping.

In the assembled state of the valve 1, the upper end 52C of each arm 52 is fastened to a dedicated attachment part 18 of the housing 10, which is advantageously carried by the stopper 16. As shown in FIGS. 5 and 6, this attachment part 18 includes, for each arm 52, a wall 18.1 making it possible to place the body 53 of the corresponding upper end 52C appropriately with respect to the attachment part 18. More specifically, this placement wall 18.1 has a main face 18.1A, which is turned away from the axis X-X and which is covered by the body 53. The placement wall 18.1 also has two opposite side edges 18.1B, which laterally border the main face 18.1A: in the assembled state of the valve 1, the fins 54 are, due to their bending toward the axis X-X relative to the body 53, respectively folded down against the side edges 18.1B. As clearly shown in FIG. 6, the fins 54 of each arm 52 thus grip, along a direction orthoradial to the axis X-X, the side edges 18.1B of the corresponding placement wall 18.1. Furthermore, in its lower region, the attachment part 18 includes, for each fin 54 of each arm 52, a rim 18.2, which is arranged protruding from the lower axial end of the corresponding side rim 18.1B and which, as shown in FIG. 6 and as clearly shown in the left half of FIG. 10, which will be described in detail hereinafter, forms a downward axial stop for the corresponding fin 54 when the latter is in its bent configuration associated with the assembled state of the valve 1. Furthermore, in its upper region, the attachment part 18 delimits, for each arm 52, a housing 18.3, which emerges axially downward and which is complementary to the tongue 55 of the corresponding arm 52: in the assembled state of the valve 1, the aforementioned tongue 55 is inserted axially into the housing 18.3 so as to position the body 53 overlapping the main face 18.1A of the placement wall 18.1, as clearly shown in FIG. 5.

Thus, in the assembled state of the valve 1, each arm 52 mechanically connects, through the inside of the sleeve 20, the heat-sensitive part 31 of the thermostatic element 30 to the attachment part 18 of the housing 10.

Other features and interests of the stirrup 50, in particular of the upper end 52C of its arms 52, will also emerge from the description below of one example of a method for manufacturing the valve 1, illustrated by FIGS. 8 to 10.

Figure 8:
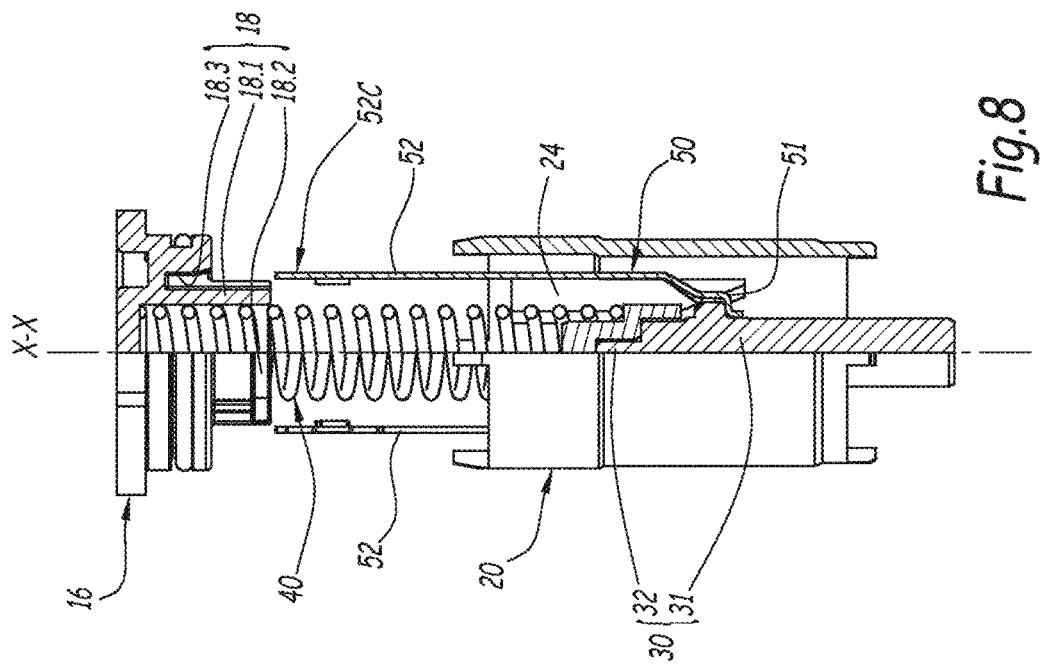
FIGS. 8 to 10 illustrate three successive moments of a method for manufacturing the valve of FIG. 1, the left half of these FIGS. 8 to 10 being an elevation view of the preassembled assembly of FIG. 1, while the right half of these figures is a sectional view of said assembly in the plane of FIG. 5.
Figure 10:
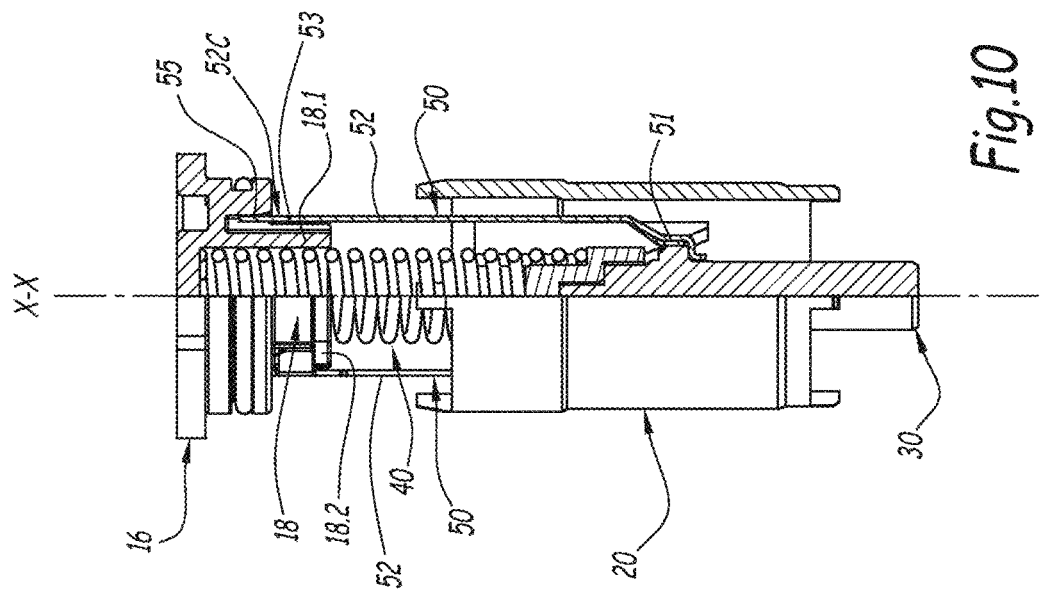
Figure 9:
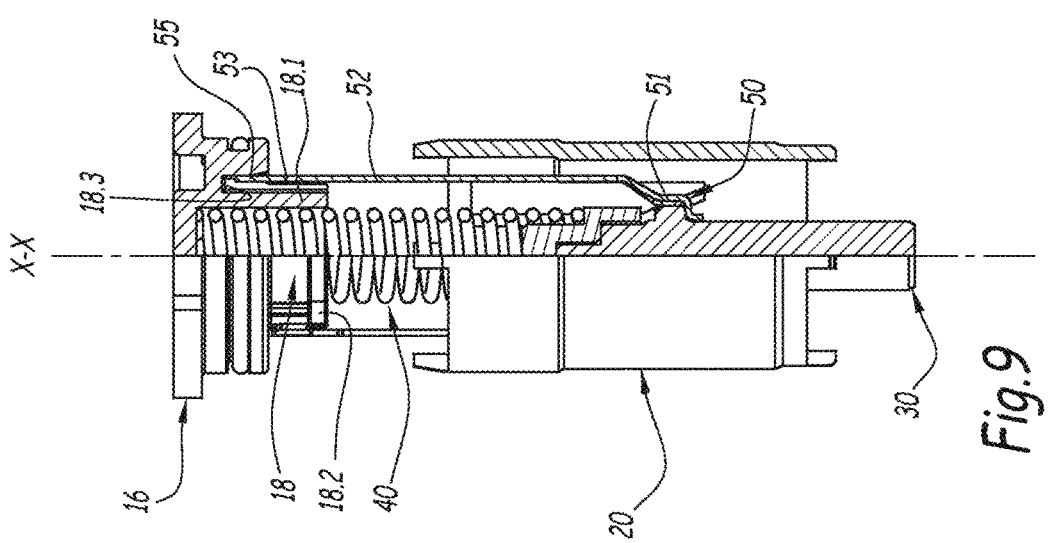

FIGS. 8 to 10, as well as FIG. 2, show an assembly containing all of the components described thus far of the valve 1, with the exception of the main body 11 of its housing 10. In FIGS. 8 and 9, the components of said assembly are in the process of being assembled, while in FIGS. 2 and 10, the components of said assembly are assembled together, the assembly then being able to be manipulated in one piece, as a preassembled whole, in order to finalize the manufacture of the valve 1.

Prior to the partial assembled state shown in FIG. 8, the heat-sensitive 31 and movable 32 parts of the thermostatic element 30 are respectively assembled to the stirrup 50 and the sleeve 20, so as to establish kinematic links between said components, as described above. Conversely, as shown in FIG. 8, the stopper 16 is not yet assembled to the stirrup 50, having noted, however, that the return spring 40 is already placed between the connecting end-piece 22 and the stopper 16, in a manner centered on the axis X-X.

It will be noted that the obtainment of the preassembled assembly, as shown in FIG. 8, requires arranging the arms 52 inside the sleeve 20: to that end, the stirrup 50 is inserted axially inside the sleeve 20 through the lower end 20B of said sleeve, while being sure to place the arms 52 between the branches 24 of the connecting end-piece 22. In particular, it will be understood that the upper ends 52C of the arms 52 may interfere axially with the branches 24 when said ends 52C progress, inside the sleeve 20, from its lower end 20B toward its upper end 20A: subject to an adjustment of the angular relative position between the stirrup 50 and the sleeve 20, the arms 52 are then passed between the branches 54, thus avoiding their axial interference, with the understanding that, as clearly shown in FIG. 6, each of the angular portions α, which are respectively occupied around the axis X-X, by the upper ends 52C of the arms 52 and which are maximal at the fins 54, is then separate from the angular portions β respectively occupied, around the axis X-X, by the branches 24.

In order to connect the heat-sensitive part 31 kinematically to the stopper 16, the method provides for carrying out two successive steps, the respective results of which are illustrated by FIGS. 9 and 10.

The first step consists of arranging the arms 52 of the stirrup 50 such that the longitudinal direction of each of said arms is substantially parallel to the axis X-X and each of said arms extends, through the inside of the sleeve 20, from the heat-sensitive part 31 to the attachment part 18. In practice, the performance of said first step first means connecting the stirrup 50 and the heat-sensitive part 31, typically via the ring 51, then adjusting the positioning between the stirrup 50 and the stopper 16 so as to position the upper end 52C of each arm 52 substantially at the axial level and across from the attachment part 18, as illustrated by comparison between FIGS. 8 and 9. This position adjustment is made easier by inserting the tongue 55 of each upper end 52C into the corresponding housing 18.3 of the attachment part 18.

The second step consists of fastening and locking each arm 52 to the attachment part 18, by plastically deforming the fins 54, by bending around the corresponding bending axis Z-Z. By comparison between FIGS. 9 and 10, it is understood that the implementation of said second step leads to passing, by bending toward the axis X-X, each fin 54 from a mounting configuration, which the fin initially occupies and in which the fin does not interfere axially with the attachment part 18 during the implementation of the aforementioned first step, and a locking configuration, occupied by the fin at the end of the second step and in which said fin axially downwardly abuts against the corresponding rim 18.2 of the attachment part 18.

In practice, the bending of the fins 54 between the mounting configuration and their locking configuration is done using any appropriate tool, said bending being made easier by configuring the corresponding placement wall 18.1, in that by overlapping of the main face 18.1A of said placement wall 18.1, the body 53 of the upper end 52C of the corresponding wall 52 is stabilized relative to the attachment part 18 during the application of bending stresses, whereas, at the same time, the folding of each fin 54 is guided against the corresponding side edge 18.1B of said folding wall 18.1. As an advantageous option, each fin 54 is, in the mounting configuration, cambered toward the axis X-X, i.e., slightly bent toward said axis X-X, in particular around the corresponding bending axis Z-Z, as shown in FIG. 7: the bending of the fin to go from its mounting configuration to its locking configuration is made easier and more reliable.

More generally, by providing, at the upper end 52C of each arm 52, fastening arrangements for fastening said arm to the attachment part 18, designed to lock to the latter by plastic deformation of at least one part of said fastening arrangements, such as the fins 54, it is understood that the fastening of the arms 52 to the housing 10 associates compactness and safety, in that on the one hand, said fastening arrangements have a low bulk, which makes it possible to connect the heat-sensitive part 31 to the attachment part 18 by the inside of the sleeve 20, and on the other hand, the obtained fastening is not removable due to the irreversibility of the plastic deformation, which makes the stirrup permanently assembled with respect to the stopper 16.

Once one has the preassembled assembly as shown in FIGS. 2 and 10, this assembly is manipulated in one piece so as to be inserted into the chamber 15 of the housing 10, until said chamber is closed by the stopper 16. The valve 1 is then obtained as shown in FIGS. 1 and 3 to 6.

Various arrangements and alternatives to the thermostatic valve 1 described thus far, as well as its manufacturing method, may also be considered. As examples:

- the relative arrangement of the orifices 12, 13 and 14 is not limited to that shown, but may on the contrary satisfy various requirements for integration within a fluid circulation circuit; thus, the main body 11 may for example be an integral part of components of the circulation circuit, such as the body of a pump or a distribution housing;
- likewise, the valve 1 can be used in circulation circuits in which the flow directions are different from those shown by the arrows F1, F2 and F3 in FIGS. 1, 3 and 4; for example, rather than providing one intake and two fluid outlets, two intakes and one outlet, or a single intake and a single outlet may be considered;
- in the extension of the two foregoing considerations, in particular based on integration specificities of the valve within a circulation circuit, it is possible to consider controlling the movement of the sleeve 20 to a usage position, in which the axial end 20A of said sleeve is pressed against the stopper 16, as illustrated by FIGS. 11 to 13; in other words, in this case, the face of the stopper 16 turned toward the chamber 15 has an axial bearing seat 16A of the end 20A of the sleeve 20; this bearing is sealed either by shape cooperation between the axial end 20A of the sleeve 20 and the seat 16A of the stopper 16, like in FIGS. 11 and 12, or by insertion of a sealing gasket 60, such as an attached O-ring or an overmolded fitting, like in FIG. 13; in practice, this arrangement may require the integration, within the valve 1, of an overtravel system, known in itself, that accommodates the relative deployment of the moving part 32 with respect to the heat-senstiive part 31 of the thermostatic element 30, beyond their deployment configuration commanding the bearing of the sleeve 20 against the stopper 16;
- the number of arms 52 of the stirrup 50 is not limiting; if applicable, even if the stirrup 50 comprises several arms, only one of them they be provided to be functionally similar to the arm 52 described thus far; likewise, the stirrup 50 may include more than two arms respectively similar to the arms 52 described thus far;
- the number and embodiment of the fins 54 are also not limiting, as long as, at the upper end 52C of the or each arm 52, a part of said upper end is plastically deformable relative to the rest of the arm 52 in order to lock fixedly to the attachment part 18 of the housing 10; and/or
- rather than kinematically connecting the heat-sensitive part 31 of the thermostatic element to the housing 10 and kinematically connecting the movable part 32 of said thermostatic element to the sleeve 20, said kinematic links may be reversed; this amounts to saying that it is then the movable part 32 that is fixedly connected to the housing 10 while the sleeve 20 is moved by the heat-sensitive part 31; this design reversal may be obtained from the valve 1 considered thus far by reversing the orientation of the thermostatic element 30, the heat-sensitive part 31 then being turned upward while the movable part 32 is turned downward.

What is claimed is:

1. A thermostatic valve for a fluid circulation circuit, the valve comprising:

a housing, which is provided with orifices for passing a fluid of the circulation circuit and inside which said fluid flows between the orifices, a sleeve for regulating the flow of the fluid in the housing between the orifices, said sleeve defining a central axis and being movable relative to the housing along said central axis, a thermostat, which comprises both a heat-sensitive part, containing a thermodilatable material and arranged on the flow of the fluid in the housing between the orifices, and a movable part, translatable relative to the heat-sensitive part along the central axis under the effect of an expansion of the thermodilatable part, a first part of the thermostat, among its heat-sensitive and movable parts, being kinematically connected to the housing by a stirrup while the second part of the thermostat is kinematically connected to the sleeve, such that the movements between the heat-sensitive and movable parts of the thermostat command, by movement of the sleeve along the central axis, the regulating action of said sleeve on the flow of the fluid in the housing between the orifices, wherein the stirrup comprises at least one arm:

that extends lengthwise parallel to the central axis, that connects, through the inside of the sleeve, the first part of the thermostat, to an attachment part of the housing, and that, at its longitudinal end opposite the first part of the thermostat, is provided with a fastener for fastening to the attachment part, said fastener being locked to the attachment part by plastic deformation of at least one part of the fastener, which is fixedly fastened to the attachment part.

2. The valve according to claim 1, wherein the fastener of each arm comprises at least one fin that, by plastic deformation, is bent toward the central axis relative to the rest of the arm, and wherein the attachment part of the housing comprises, for each fin, a rim that is suitable for forming a stop along the central axis for the fin.

3. The valve according to claim 2, wherein each fin is bent around a bending axis that is parallel to the central axis.

4. The valve according to claim 2, wherein the fasteners of each arm further comprises a body that is arranged in the longitudinal extension of the arm, each fin of said arm protruding from said body and being bent toward the central axis relative to said body, and wherein the attachment part of the housing comprises, for each arm, a placement wall comprising:

a main face, which is covered by the body, and for each fin, a side edge, at an axial end of which the corresponding rim is arranged protruding and against which the rim is folded down.

5. The valve according to claim 4, wherein two fins are provided for each arm, and wherein the two fins protrude on either side of the body and are folded down respectively against the corresponding side edges of the placement wall while gripping said placement wall between them.

6. The valve according to claim 4, wherein the fastener of each arm further comprises a tongue, which extends the body in the longitudinal direction of the arm, and wherein the attachment part of the housing delimits, for each arm, a housing, which is complementary to the tongue and in which the tongue is inserted along the central axis, so as to position the body covering the main face of the corresponding placement wall.

7. The valve according to claim 1, wherein at least two arms are provided, the arms being distributed regularly around the central axis.

8. The valve according to claim 1, wherein the sleeve is inwardly provided with at least one branch for connecting to the second part of the thermostat, each branch extending transversely to the central axis, and wherein the fastener of each arm occupies, around the central axis, one or several angular portions that are separate from one or more angular portion(s) respectively occupied, around the central axis, by the branch or branches.

9. The valve according to claim 1, wherein the attachment part is supported by a stopper of the housing, which is removable relative to the rest of the housing and which, in the assembled state of the valve, sealably closes an inner chamber of the housing, by which the fluid flows into the housing between the orifices.

10. The valve according to claim 9, wherein the stopper bears, on its face turned toward the inner chamber, a sealed bearing seat for an axial end of the sleeve.

11. The valve according to claim 9, wherein the valve further comprises a return spring provided to return the movable part toward the heat-sensitive part of the thermostat during a contraction of the thermodilatable material, and wherein the return spring is inserted, in a compressed state along the central axis, between the second part of the thermostat and the housing, while bearing axially against the stopper.

12. A method for manufacturing a thermostatic valve for a fluid circulation circuit, the valve comprising:
   a housing, which is provided with orifices for passing a fluid of the circulation circuit and inside which said fluid flows between the orifices,
   a sleeve for regulating the flow of the fluid in the housing between the orifices, said sleeve defining a central axis and being movable relative to the housing along said central axis, and
   a thermostat, which comprises both a heat-sensitive part, containing a thermodilatable material and arranged on the flow of the fluid in the housing between the orifices, and a movable part, translatable relative to the heat-sensitive part along the central axis under the effect of an expansion of the thermodilatable material,
in which method a stirrup is used to kinematically connect a first part of the thermostat, among its heat-sensitive and movable parts, while the second part of the thermostat is kinematically connected to the sleeve, such that, in the assembled state of the valve, the movements between the heat-sensitive and movable parts of the thermostat command, by movement of the sleeve along the central axis, the regulating action of said sleeve on the flow of the fluid in the housing between the orifices,
wherein in order to kinematically connect the first part of the thermostat to the housing, the method provides that:
   during a first step, at least one arm of the stirrup is arranged such that the longitudinal direction of said arm is parallel to the central axis and each arm extends lengthwise, through the inside of the sleeve, from the first part of the heat-sensitive part to an attachment part of the housing, then
   during a second step, each arm is fastened and locked to the attachment part of the housing, by plastically deforming at least one part of a fastener, with which the longitudinal end of the arm is provided opposite the first part of the thermostat, so as to fixedly fasten said at least one part to the attachment part.

13. The method according to claim 12, in order to carry out the first step, the method provides that:
   the stirrup is kinematically connected to the first part of the thermostat, then
   the relative positioning of the stirrup and the housing is adjusted so as to position the fastener axially aligned with and across from the attachment part of the housing.

14. The method according to claim 12, wherein to carry out the second step, at least one fin of the fastener is bent toward the central axis so as to take each fin from a mounting configuration, in which the fin does not interfere axially with the attachment part during the first step, to a locking configuration, in which the fin abuts, toward the central axis, against a rim of the attachment part.

15. The method according to claim 14, wherein in the mounting configuration, each fin is cambered toward the central axis.

* * * * *